US011976257B2

(12) United States Patent
Smith

(10) Patent No.: US 11,976,257 B2
(45) Date of Patent: *May 7, 2024

(54) HIGH BUTTERS CONTENT SOAP AND METHODS

(71) Applicant: Vanguard Soap LLC, Memphis, TN (US)

(72) Inventor: Scott Smith, Memphis, TN (US)

(73) Assignee: Vanguard Soap LLC, Memphis, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/698,428

(22) Filed: Mar. 18, 2022

(65) Prior Publication Data

US 2022/0204892 A1 Jun. 30, 2022

Related U.S. Application Data

(63) Continuation of application No. 16/023,796, filed on Jun. 29, 2018, now Pat. No. 11,299,694.

(60) Provisional application No. 62/527,018, filed on Jun. 29, 2017.

(51) Int. Cl.

| | |
|---|---|
| ***A61K 8/00*** | (2006.01) |
| ***A61Q 19/10*** | (2006.01) |
| ***C11C 1/02*** | (2006.01) |
| ***C11D 9/22*** | (2006.01) |
| ***C11D 9/26*** | (2006.01) |
| ***C11D 9/48*** | (2006.01) |
| ***C11D 13/18*** | (2006.01) |
| ***C11D 13/20*** | (2006.01) |

(52) U.S. Cl.

CPC ................ *C11D 9/48* (2013.01); *A61Q 19/10* (2013.01); *C11C 1/025* (2013.01); *C11D 9/225* (2013.01); *C11D 9/262* (2013.01); *C11D 9/267* (2013.01); *C11D 13/18* (2013.01); *C11D 13/20* (2013.01)

(58) Field of Classification Search

CPC ................................. C11D 9/48; A61Q 19/10

See application file for complete search history.

(56) References Cited

U.S. PATENT DOCUMENTS

2014/0220089 A1* 8/2014 Ambrosen ........... A61K 8/0216 424/401
2016/0331675 A1* 11/2016 Jamerson ............ A61K 8/9789
2020/0170914 A1* 6/2020 Cohen ................. C11D 17/006

* cited by examiner

*Primary Examiner* — Necholus Ogden, Jr.
(74) *Attorney, Agent, or Firm* — Epstein Becker Green

(57) ABSTRACT

An all-natural, moisturizing soap composition that allows for high vegetable butter fat content while also being capable of processing for high quality bar soap (moisturizing properties without sticky pellets, brittleness, cracking, and/or inhibition of lather formation) and a method for making the same and other soaps is provided. The soap composition may contain up to 50% vegetable butter fat(s). The semi-continuous process for saponification provides a fast and energy efficient alternative to prior art methods, while also allowing for high quality bar soap that contains a high content (up to 50%) of vegetable butter fat(s).

2 Claims, No Drawings

HIGH BUTTERS CONTENT SOAP AND METHODS

CROSS-REFERENCES TO RELATED APPLICATIONS

This application is a continuation of U.S. application Ser. No. 16/023,796, filed Jun. 29, 2018, which claims the benefit of priority to U.S. Provisional Application Ser. No. 62/527,018, filed Jun. 29, 2017, both of which are hereby incorporated by reference herein in their entirety.

FIELD OF THE INVENTION

The present invention is generally directed toward soaps with a high butters content and methods of making the same, and more specifically to bar soaps having high concentrations of vegetable butters that retain excellent cleansing and moisturizing properties and a semi-continuous method for producing the same.

BACKGROUND OF THE INVENTION

Soap can be defined as a salt of one or more of the higher fatty acids with an alkali or metal. Most soaps are made by the action of potassium or sodium hydroxide on animal fats and vegetable oils (or fatty acids). The preparation of soap directly from the raw fatty acids by the use of a lye (either potassium or sodium hydroxide) is referred to as saponification, which is well known in the art of soap manufacture.

For cleansing soaps, additional ingredients are usually added to provide properties that are desirable to the consuming public: namely, moisturizing agents, colorants, and fragrances. Fragrances may provide an appealing aroma, but may also be used to mask the natural odor of some raw ingredients. Also, fragrances may be added to provide a sensory therapeutic benefit to the soap product. Colorants provide a desired hue to the finished soap product. Moisturizers are typically provided to counteract the drying tendency of soaps. Butter fats from vegetables, such as shea and cocoa butters, are often used as moisturizers in soaps because have a melting temperature that is at or near the average human body temperature, which enhances the moisturizing feel of these fats. However, butter fats also include a high content of compounds that are hard to saponify, such as high glycerin content, as well as others. The higher the butter fat content, the more moisturizing properties are in the soap. If high quantities of butter fats are used in a saponification batch, especially the "semi-boil" process that requires live steam heat, bar soap becomes very difficult to manufacture from the resulting soap. Soap manufacturers have adopted the "continuous" process for its efficiencies. The continuous process is an expensive capital investment, but it allows for precise control of the saponification reaction by PLC-controlled injection of feed stocks, lye, and other ingredients as saponified oils (soap) is removed for drying.

Softer soap, like those that contain high vegetable butter fat content are notoriously sticky during and after drying and resist the milling process (i.e., triple mill) used to homogenize the manufactured soap in its pellet, chip, or "noodle" form before cutting and pressing soap bars. Thus, there is a practical limit of about 5% to the content of moisturizing natural vegetable butter fats in commercially produced bar soaps. As a result, many manufacturers must limit the content of these natural butter fats or substitute with synthetic moisturizers, such as surfactants and other synthetic conditioning agents, i.e., quaternary compounds, silicones, and cationics.

There is a need for all natural moisturizing bar soap compositions that contain a high content of vegetable butter fat.

SUMMARY OF THE INVENTION

The present invention addresses the needs and the shortcomings in the prior art discussed above, as well as others, by providing inter alia in one aspect all-natural, moisturizing soap compositions that allow for high vegetable butter fat content while also being capable of processing for high quality bar soap (moisturizing properties without sticky pellets, brittleness, cracking, and/or inhibition of lather formation). The high butter fat content soap compositions comprise up to 50% vegetable butter fat. Some embodiments contain more than 5% by weight butter fat content. Some embodiments contain more than 15% by weight butter fat content. Other embodiments contain 25% by weight or more butter fat content. Still other embodiments contain 30% by weight or more butter fat content. Still further embodiments contain 40% by weight or more butter fat content. In preferred embodiments, the high butter fat content soap compositions comprise a mixture of vegetable butter fats as shea butter and cocoa butter. Preferably, the ratio of soft butter to hard butter is 5:1. The high butter fat content soap compositions may be pelletized (including, but not limited to, pellets, chips, and soap noodles) or it may be formed into bar soap.

In another aspect, the present invention provides for a semi-continuous process for a saponification reaction yielding moisturizing soap compositions that allow for high vegetable butter fat content while also being capable of processing for high quality bar soap (excellent moisturizing properties without sticky pellets, brittleness, cracking, and/or inhibition of lather formation). The semi-continuous process utilizes a jacketed reaction vessel that captures and conserves energy in the form of heat by returning it to the boiler. Preferably, no live steam is used to heat the saponification reaction in the semi-continuous process. The reaction components of oils and vegetable butter fats are added to the jacketed reaction vessel and mixed under good agitation. The semi-continuous process allows up to 50% vegetable butter fat in the saponification reaction. In preferred embodiments, the butter fat content comprises a mixture of vegetable butter fats as soft butters and hard butters, such as shea butter and cocoa butter, respectively. Preferably, the ratio of soft butter to hard butter is 5:1. Approximately 75-80% of the alkali (lye) component is added to the oil and butter mixture in the presence of water to initiate the saponification, and the reaction is allowed to exotherm to about 85° C. When the temperature stabilizes the rest of the total alkali is added. Once the temperature stabilizes again, the batch is adjusted to specification. The resulting high butter fat content soap compositions are then sent to be dried and pelletized (including, but not limited to, pellets, chips, and soap noodles).

DETAILED DESCRIPTION

The following detailed description is presented to enable any person skilled in the art to make and use the invention. For purposes of explanation, specific details are set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the scope of the invention. The present invention is not intended to be limited to the embodiments shown, but is to be accorded the widest possible scope consistent with the principles and features disclosed herein.

In one aspect, the present invention provides all-natural, moisturizing soap compositions that allow for high vegetable butter fat content while also being capable of processing for high quality bar soap (excellent moisturizing properties without sticky pellets, brittleness, cracking, and/or inhibition of lather formation). Using modern soap manufacturing processes, such as full-boil, semi-boil, and continuous processes, the resulting liquid soap must be dried to form bar soap. The resulting dried and pelletized soap (e.g., pellets, chips, and soap noodles) are then homogenized by a triple milling process with or without additives (e.g., colorants and/or fragrances). Moisturizing bar soap contains vegetable butter fat, such as shea butter and cocoa butter. Higher concentrations of these butter fats in bar soap generally provide better moisturizing properties. However, high butter fat content makes dried soap pellets soft and sticky, which resists the milling and other processes for making soap bars. High butter fat content also can work against the cleansing power of the soap by inhibiting lather, as well as make the soap bar brittle or susceptible to cracking.

Disclosed herein is a semi-continuous process of saponification that allows for substantially higher vegetable butter fat content than is achieved using prior art methods, but still results in high quality bar soap. The high butter fat content soap compositions comprise up to 50% vegetable butter fat. Some embodiments contain more than 20% by weight butter fat content. Other embodiments contain 25% by weight or more butter fat content. Still other embodiments contain 30% by weight or more butter fat content. Still further embodiments contain 40% by weight or more butter fat content. In preferred embodiments, the high butter fat content soap compositions comprise a mixture of vegetable butter fats as shea butter and cocoa butter. Preferably, the ratio of soft butter to hard butter is 5:1. The high butter fat content soap compositions may be pelletized (including, but not limited to, pellets, chips, and soap noodles). The pelletized high butter fat content soap compositions are not soft or sticky, and can be used in traditional triple milling homogenization processes for moisturizing bar soap manufacturing. The pelletized high butter fat content soap compositions may be commoditized or they may be formed into moisturizing bar soap for consumers Mass production saponification methods rarely achieve greater than 20% by weight vegetable butter fat content for the production of bar soap quality pelletized soap. Due to the limitations noted above for the drawbacks to having high butter fat content, manufacturers limit the total butter fat content to avoid poor quality bar soap products. While some small batch processes are known to achieve up to 28% by weight vegetable butter fat content as a moisturizing component of all-natural bar soaps, the semi-continuous process (described in more detail below) allows for up to 50% by weight vegetable butter fat content in a high quality bar soap. Importantly, the high vegetable butter fat content of the soap compositions of the present invention are high quality soaps without loss of lather ability (cleansing power) or prone to cracking/brittle. In some embodiments, the total butter fat content is about 50% by weight. In other embodiments, the total butter fat content is 49%. In other embodiments, the total butter fat content is 48%. In other embodiments, the total butter fat content is 47%. In other embodiments, the total butter fat content is 46%. In other embodiments, the total butter fat content is 45%. In other embodiments, the total butter fat content is 44%. In other embodiments, the total butter fat content is 43%. In other embodiments, the total butter fat content is 42%. In other embodiments, the total butter fat content is 41%. In other embodiments, the total butter fat content is 40%. In other embodiments, the total butter fat content is 39%. In other embodiments, the total butter fat content is 38%. In other embodiments, the total butter fat content is 37%. In other embodiments, the total butter fat content is 36%. In other embodiments, the total butter fat content is 35%. In other embodiments, the total butter fat content is 34%. In other embodiments, the total butter fat content is 33%. In other embodiments, the total butter fat content is 32%. In other embodiments, the total butter fat content is 31%. In other embodiments, the total butter fat content is 30%. In other embodiments, the total butter fat content is 29%. In other embodiments, the total butter fat content is 28%. In other embodiments, the total butter fat content is 27%. In other embodiments, the total butter fat content is 26%. In other embodiments, the total butter fat content is 25%. In other embodiments, the total butter fat content is 24%. In other embodiments, the total butter fat content is 23%. In other embodiments, the total butter fat content is 22%. In other embodiments, the total butter fat content is 21%. In other embodiments, the total butter fat content is 20%. In other embodiments, the total butter fat content is 19%. In other embodiments, the total butter fat content is 18%. In other embodiments, the total butter fat content is 17%. In other embodiments, the total butter fat content is 16%. In other embodiments, the total butter fat content is 15%. In other embodiments, the total butter fat content is 14%. In other embodiments, the total butter fat content is 13%. In other embodiments, the total butter fat content is 12%. In other embodiments, the total butter fat content is 11%. In other embodiments, the total butter fat content is 10%. In other embodiments, the total butter fat content is 9%. In other embodiments, the total butter fat content is 8%. In other embodiments, the total butter fat content is 7%. In other embodiments, the total butter fat content is 6%. In some embodiments, the total butter fat content is between about 40% and about 50% by weight. In other embodiments, the total butter fat content is between about 34% and about 39%. In still other embodiments, the total butter fat content is between about 29% and about 33%. In yet other embodiments, the total butter fat content is between about 23% and about 28%. In still other embodiments, the total butter fat content is between about 14% and about 22%. In still further embodiments, the total butter fat content is between about 6% and about 13%. This high vegetable butter fat content provides a great moisturizing "after feel" without the need for additional synthetic ingredients, such as surfactants and other synthetic conditioning agents (i.e., quaternary compounds, silicones, and cationics) found in many commercial moisturizing bar soaps of today. The resulting bar soap also is not too soft or brittle/prone to cracking.

A moisturizing bar soap must also have excellent cleansing power to satisfy consumer product demands. All-natural oils, such as palm oil, coconut oil, palm kernel oil, and others are typically used for their cleansing power in bar soaps. Thus, the high butter fat content soap compositions do not require surfactants or detergents for cleansing or moisturizing. High butter fat content soap compositions also do not suffer from inhibition of lather like other known high butter fat soaps. Compared to the content of butter fat(s) by weight, 50% by weight or more of raw natural oils and fatty acids are used. In preferred embodiments, palm oil, coconut oil, or a mixture thereof comprises the remainder of the saponification reaction fats/oils (i.e., butter fats and oils/fatty acids equal 100% total weight of the saponification reaction components, as used herein). Other natural oils and fatty acids known in the industry (e.g., olive oil, sunflower oil, etc.) may be used in addition to or in substitution of palm oil and/or coconut oil. Any ratio of oils and fatty acids can be used when provided as more than one raw oil reaction component (as one non-limiting example: about 1:1, 1:2, 1:3, 1:4, 1:5, 1:6, etc. coconut oil to palm oil, or vice versa). In addition to the saponification reaction fats/oils, alkali (lye) and water are also present in the reaction vessel.

Many vegetable butters may be used in the present invention. As stated above, the preferred ratio is 5:1 of a soft butter fat to a hard butter fat. Examples of "soft" vegetable butter fats that may be used in the present invention are shea butter, mango butter, avocado butter, almond butter, aloe butter, apricot kernel butter, coconut cream, hemp butter, jojoba butter, kukui nut butter, macadamia butter, and mowrah butter. Examples of "hard" vegetable butter fats that may be used include cocoa butter, illipe butter, chaulmoogra butter, cupuacu butter, dhupa butter, kokum butter, maria (white cocoa) butter, sal butter, tucuma butter, and ucuuba butter.

In another aspect, the present invention provides for a semi-continuous process for a saponification reaction yielding moisturizing soap compositions that allow for high vegetable butter fat content while also being capable of processing for high quality bar soap (excellent moisturizing properties without sticky pellets, brittleness, cracking, and/or inhibition of lather formation). The novel semi-continuous process utilizes a jacketed stainless steel reaction vessel that captures and conserves energy in the form of heat by returning it to the boiler. Preferably, no live steam is used to heat the saponification reaction in the semi-continuous process, thus providing additional energy savings to the soap manufacturer.

The reaction components of oils and vegetable butter fats are added to the jacketed reaction vessel and mixed under good agitation. The semi-continuous process allows up to 40% vegetable butter fat in the saponification reaction. In preferred embodiments, the butter fat content comprises a mixture of vegetable butter fats as soft butters and hard butters, such as shea butter and cocoa butter, respectively. Preferably, the ratio of soft butter to hard butter is 5:1. For example, in one preferred embodiment, to a jacketed semi-continuous process reaction vessel is added a 5:1 ratio of shea butter to cocoa butter that comprises 40% by weight of the saponification reaction fats/oils. The remaining 60% by weight of the saponification reaction fats/oils is comprised of a 75:25 weight ratio of palm oil and coconut oil. The butter fats and oils may be premixed with one or more other component or added directly to the jacketed reaction vessel individually. The reaction vessel is maintained under good agitation with impellers and heated to about 50° C. to melt the butter fats and oils.

Approximately 75-80% of the calculated alkali (lye) component is added to the oil and butter mixture in the presence of water to initiate the saponification, and the reaction is allowed to exotherm to about 85° C. The exothermic reaction conserves energy by lowering the amount of exogenous heat required to achieve the reaction temperature. Also, very little rise occurs under these conditions. In some prior art saponification processes, the rise of the reaction must be carefully monitored and maintained at acceptable levels. When the temperature stabilizes the rest of the total alkali is added and full reaction temperature is then achieved. Once the temperature stabilizes again, the batch is adjusted to specification.

In the current method, to achieve free alkaline stability with very limited alkalinity, the base formulation of hard vegetable fats and soft vegetable fats are reacted until a stable alkalinity of 0.03 ppm to 0.15 ppm is reached. The preferred alkalinity for the composition taught herein is 0.05 ppm. Testing is conducted to analyze and ensure the resulting alkalinity number repeats itself, thus confirming the stability. After the necessary alkalinity range is reached and the entire mass of the composition is saponified, the composition is further processed to add free fat or oils back into the composition up to 10% by weight of free fat or oils, with the preferred free fat of the composition by weight being 5%.

In addition to the jacketed vessel semi-continuous process discussed herein, the soap composition can be manufactured in a non-jacketed vessel with open steamed coils or via a continuous process by running live steam into the soap mixture kettle containing oils and alkali.

The resulting high butter fat content soap compositions are liquid after the soap manufacturing systems listed above are completed. This raw soap is then sent to be dried and pelletized (including, but not limited to, pellets, chips, and soap noodles). The soap noodles (or other pellet forms) can then be stored and sold as a commodity or further processed to make bar soap. Preferably, the soap noodles are triple milled (with or without additional ingredients, such as colorants and fragrances) before cut and pressed into bars. Alternatively, the soap noodles can be used in a melt and pour process to make soap bars. The latter step is not preferred due to the difficulties in achieving mass production scales under this method.

The saponification reaction proceeds quickly and efficiently. The semi-continuous process described above can be completed in less than 1.5-2.0 hours in batches up to 100,000 lbs. and beyond. In comparison to a prior art semi-boil process using live steam that could take 8-10 hours to complete a 100,000 lbs. reaction, a similar semi-continuous process reaction can be completed in less than 1.5 hours for a large scale reaction. The resulting savings for the manufacturer include decreased man-hours to produce the same amount of raw soap and decreased energy expenditures (both in the amount needed to run the reaction and in conservation using the jacketed vessel).

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

The invention has been described with reference to various specific and preferred embodiments and techniques. However, it should be understood that many variations and modifications may be made while remaining within the spirit and scope of the invention. It will be apparent to one of ordinary skill in the art that methods, devices, device elements, materials, procedures and techniques other than those specifically described herein can be applied to the practice of the invention as broadly disclosed herein without resort to undue experimentation. All art-known functional equivalents of methods, devices, device elements, materials, procedures and techniques described herein are intended to be encompassed by this invention. Whenever a range is disclosed, all subranges and individual values are intended to be encompassed. This invention is not to be limited by the embodiments disclosed, including any shown in the drawings or exemplified in the specification, which are given by way of example and not of limitation.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

What is claimed is:

1. An all-natural, moisturizing soap composition consisting of: 5% to 50% by weight vegetable butter fat, wherein the vegetable butter fat further comprises:

a) a soft vegetable butter fat selected from a group consisting of mango butter, avocado butter, almond butter, aloe butter, apricot kernel butter, coconut cream, hemp butter, jojoba butter, kukui nut butter, macadamia butter, mowrah butter, and combinations thereof;

b) a hard vegetable butter fat selected from a group consisting of cocoa butter, illipe butter, chaulmoogra butter, cupuacu butter, dhupa butter, maria (white cocoa) butter, sal butter, tucuma butter, ucuuba butter, and combinations thereof;

c) optionally wherein a ratio of the soft vegetable butter fat to the hard vegetable butter fat is 5:1;

d) optionally wherein the soap composition further comprises up to 10% by weight of one or more of free fat and oils or a balance of oils by weight;

e) optionally wherein the soap composition further comprises palm oil, coconut oil, olive oil, sunflower oil, or a mixture thereof;

f) optionally wherein the soap composition further comprises sodium hydroxide, potassium hydroxide or combinations thereof;

g) optionally wherein said composition is pelletized;

h) optionally wherein the pelletized composition of option (g) is configured to form a moisturizing bar soap.

2. An all-natural, moisturizing soap composition consisting of 5% to 50% by weight vegetable butter fat, wherein the vegetable butter fat further comprises less than 32% by weight of shea butter and a hard vegetable fat selected from a group consisting of cocoa butter, illipe butter, chaulmoogra butter, cupuacu butter, dhupa butter, maria (white cocoa) butter, sal butter, tucuma butter, ucuuba butter, and combinations thereof;

a) optionally wherein a ratio of the soft vegetable butter fat to the hard vegetable butter fat is 5:1;

b) optionally wherein the soap composition further comprises 50% or more of natural oils and fatty acids or a balance of oils by weight;

c) optionally wherein the soap composition further comprises palm oil, coconut oil, olive oil, sunflower oil, or a mixture thereof;

d) optionally wherein the soap composition further comprises sodium hydroxide, potassium hydroxide or combinations thereof;

e) optionally wherein said composition is pelletized; and f) optionally wherein the pelletized composition of option (e) is configured to form a moisturizing bar soap.

* * * * *